Dec. 13, 1960  J. MERCIER  2,964,270
STABILIZING HYDRAULIC FOLLOW-UP SYSTEM
Filed March 27, 1957  3 Sheets-Sheet 1
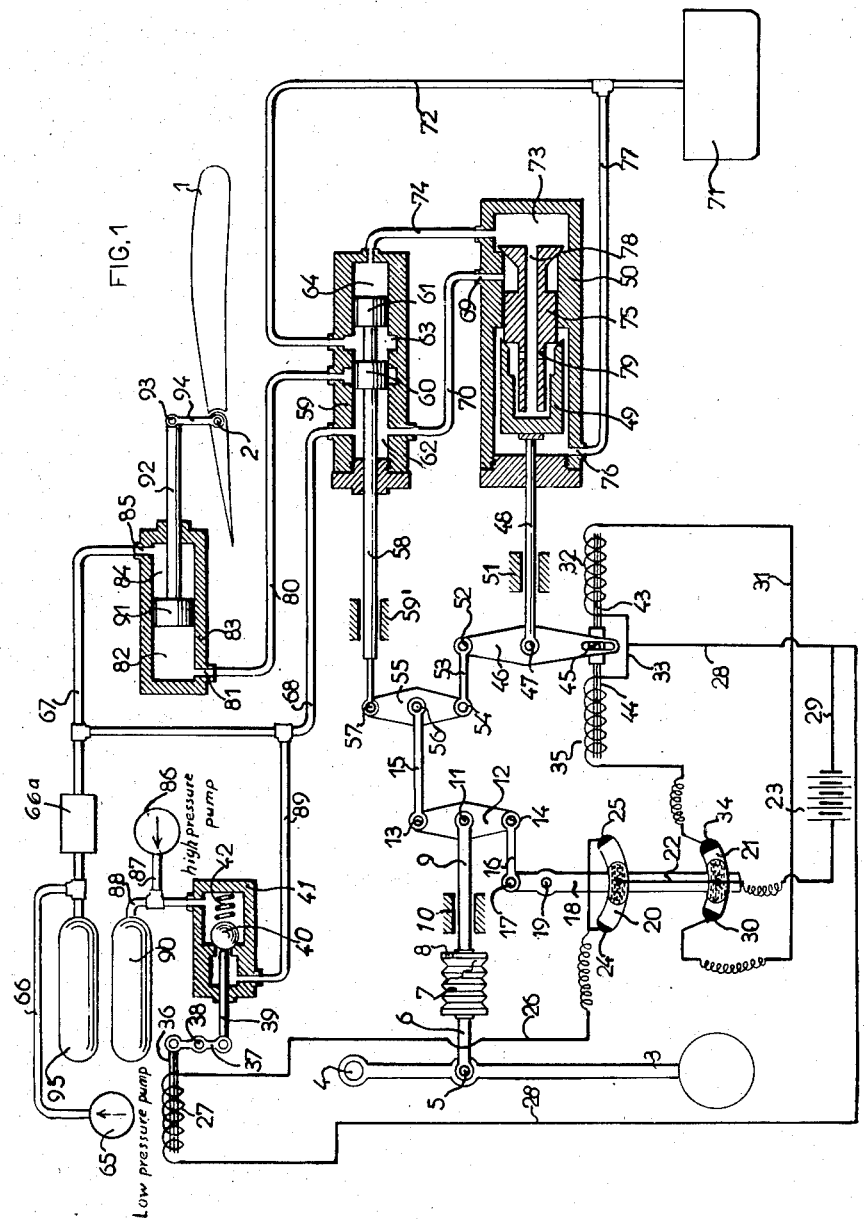
INVENTOR.
JEAN MERCIER.
BY [signature]
ATTORNEYS.

Dec. 13, 1960    J. MERCIER    2,964,270
STABILIZING HYDRAULIC FOLLOW-UP SYSTEM
Filed March 27, 1957    3 Sheets-Sheet 2
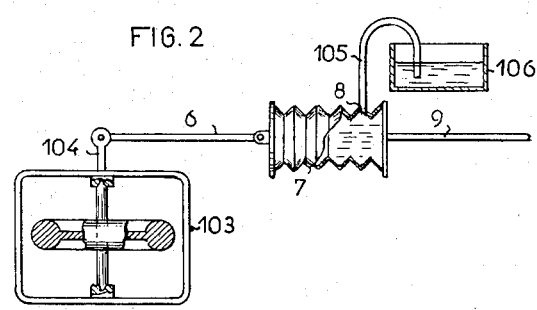
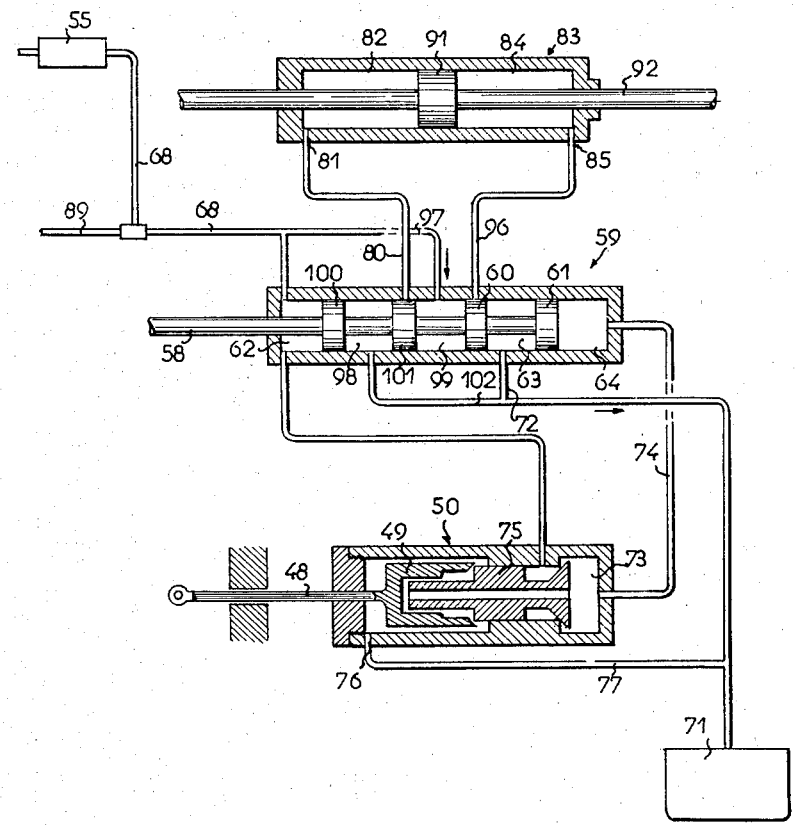
INVENTOR.
JEAN MERCIER,
BY
ATTORNEYS.

Dec. 13, 1960 J. MERCIER 2,964,270
STABILIZING HYDRAULIC FOLLOW-UP SYSTEM
Filed March 27, 1957 3 Sheets-Sheet 3
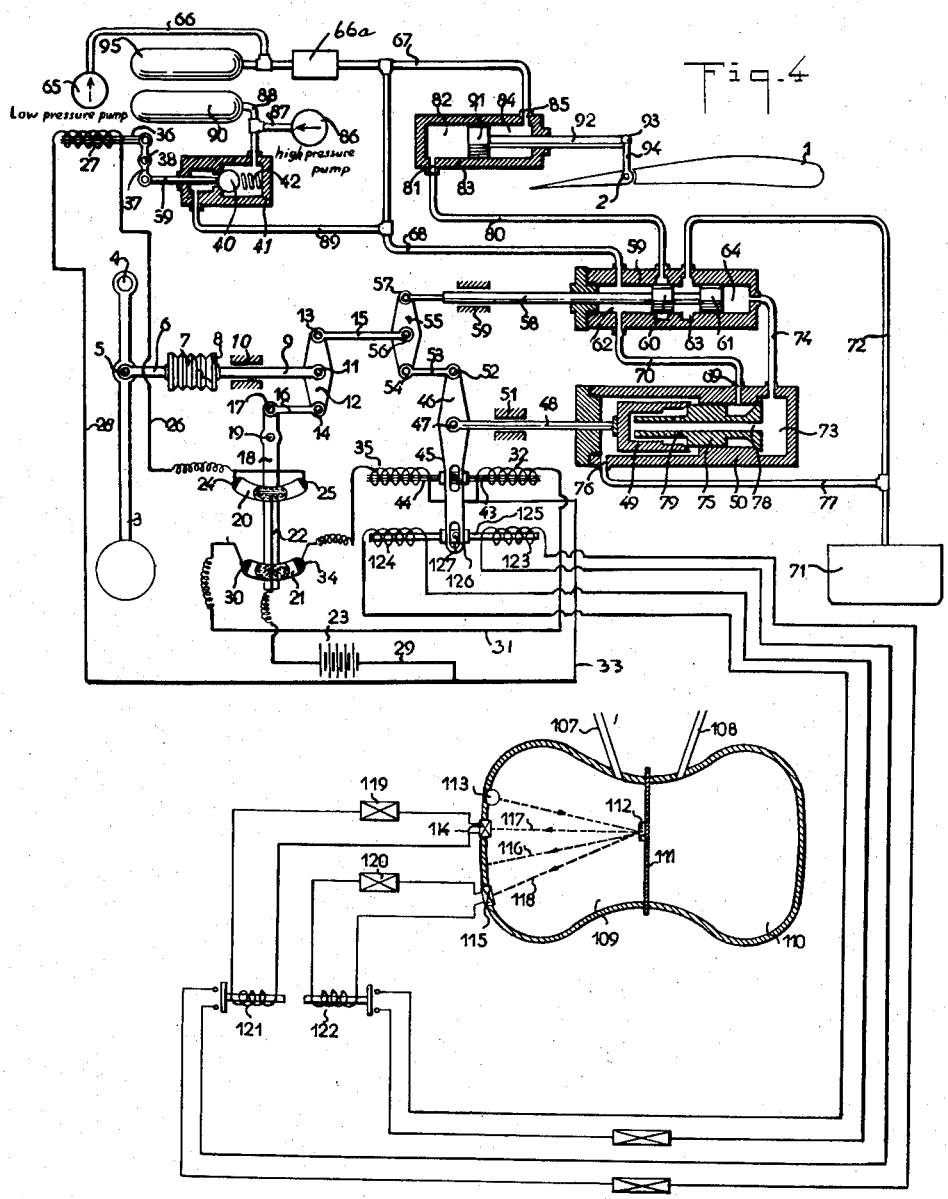
INVENTOR
JEAN MERCIER
BY Dean, Fairbank & Hirsch
ATTORNEYS

United States Patent Office 2,964,270
Patented Dec. 13, 1960

2,964,270

STABILIZING HYDRAULIC FOLLOW-UP SYSTEM

Jean Mercier, 1185 Park Ave., New York, N.Y.

Filed Mar. 27, 1957, Ser. No. 648,913

15 Claims. (Cl. 244—80)

This invention relates to the art of hydraulic follow-up systems.

It is a continuation-in-part of patent application Serial No. 297,461 filed on July 7, 1952, now Patent No. 2,791,092, dated May 7, 1957.

The invention more particularly refers to such hydraulic systems for imparting a shift to a control surface, such as a flap of an aircraft or a submarine, etc., for stabilizing the same. In the following specification and claims the term "craft" will be used for simplification purposes to cover any type of ship, boat, submarine, aerodyne, missile, etc.

As conducive to an understanding of the invention, it is noted that, to keep a craft stabilized, only a relatively small displacement is required of the stabilizing control surface, on either side of a neutral position, which requires but relatively low power. On the contrary, to reestablish equilibrium rapidly and by a considerable amount upon a sudden destabilizing action, such as a wind blow or wave shocks, which occurs only unfrequently, a corresponding rapid and extensive displacement of the control surface must be effected. This requires relatively high power and such a high power is also required when the movement of the control surface is impeded, such as by the resistance of the surrounding fluid.

Thus, the resistance encountered by the control surface when the same is to be displaced, is a function of the shift with respect to the neutral position, as well as the speed, the acceleration and the gradient of acceleration of such shift.

Where a hydraulic system is provided with a single source of fluid under pressure to ensure stabilizing, although only relatively low-fluid pressure is normally required to effect the usual small displacements of the control surface, the system has to be a high-pressure system to provide the occasional high-pressure fluid required with the resultant need for considerable power.

It is accordingly, among the objects of the invention, to provide a stabilizing hydraulic follow-up system, relatively simple in construction, not likely to become deranged, which provides both a low- and a high-pressure source of fluid and which will automatically and dependably switch the high-pressure source into and out of operation, as required, with consequent economy in power consumption.

According to the invention, fluid under a relatively low pressure is available to effect the normal operation of a stabilizing control surface of a craft in response to disturbances of the normal attitude of said craft.

Another object of the invention is to provide a stabilizing hydraulic follow-up system of the type described, wherein said automatic low pressure-high pressure switching is responsive to the shift of the control surface, as well as the speed, acceleration and gradient of acceleration of said shift.

Still another object of the invention is to ensure an automatic control of the selective low pressure-high pressure switching directly from a pendulum system responsive to the attitude of the craft.

An alternative object of the invention is to replace the said pendulum system by a gyro.

Yet a further object of the invention is to render the switching responsive to the speed of the shift by means of an apertured bellows exerting a retarding effect on the action of the pendulum system or gyro, or systems giving similar results, such as that commercially known as "Vibragyro."

Still a further object of the invention is to render the switching responsive to the acceleration of the shift by means of a three-way distributor preferably without backlash correcting the action of the pendulum system or gyro, or the like.

It is another object of the invention to render the switching responsive to the gradient of acceleration of the shift by means of a differential distributor correcting the action of the pendulum system or gyro, or the like.

Still another object of the invention is to complete the action of the above-mentioned pendulum system or gyro, or the like, by means of a device including at least one pair of Pitot-like tubes, responsive to difference of pressure arising in the vicinity of the craft to be stabilized, due to extraneous perturbations. This device permits triggering the stabilizing hydraulic system, prior to the passage of the craft through a perturbation zone, or before a perturbation progressing quicker than the craft overreaches the same, which avoids any delay in the stabilizing effect.

Other objects and conditions of the invention will be apparent from the following detailed description, together with the accompanying drawings submitted for purpose of illustration only and not intended to limit the scope of the invention, reference being had for that purpose to the subjoined claims.

In these drawings:

Fig. 1 shows an embodiment of the invention to be used for stabilizing a craft under the control of a pendulum system.

Fig. 2 shows an illustrative embodiment in which the control is effected by means of a gyro.

Fig. 3 illustrates an alternative construction of the differential distributor of the hydraulic system.

Fig. 4 shows another embodiment in which the action of the gyro, or pendulum system, is corrected by means of a pressure-responsive device.

In the embodiment shown in Fig. 1, the stabilization of a craft is obtained by operation of a pivoted member, such as a flap 1 keyed on a shaft 2. Said shaft is controlled by a stabilizing hydraulic follow-up system according to the invention, in response to the tilting of a pendulum 3, which tilting automatically takes place whenever the craft tends to be destabilized by an external action, such as windblows for an aircraft or wave shocks for a submarine, and so on.

The pendulum 3 is pivoted at 4 and pivotally connected as at 5 to a rod 6 which through a bellows 7 that is provided with a free opening 8, contro's, another rod 9, slidably mounted at 10 and pivotally connected at its end opposite the bellows 7, as indicated at 11, on a swing arm 12. Pivoted to the ends of swing arm 12 as at 13 and 14 are rods 15 and 16, respectively. Rod 16 is pivoted at its free end, as indicated at 17, on a second pendulum 18, pivoted at 19 and carrying two mercury switches 20 and 21 respectively. Both mercury switches are continuously connected through a conductor 22 with one terminal of an electric current source, such as a battery 23. The fixed contacts 24, 25 of the mercury switch 20 are connected in parallel, through a conductor 26, with the operating coil 27 of an electro-magnet, also connected through conductors 28, 29 with the other terminal of the battery 23.

One fixed contact 30 of the other mercury switch 21 is connected through a conductor 31 with the operating coil 32 of a second electro-magnet, also connected through conductors 33, 28 and 29 with said other terminal of the battery 23. Similarly, the other fixed contact 34 of the second mercury switch 21 is connected with the operating coil 35 of a third electro-magnet, also connected through conductors 33, 28 and 29, with said other terminal of the battery 23. The movable core 36, controlled by the first electro-magnet coil 27, actuates through a swing-arm 37, pivoted at 38 on a stationary part, a rod 39 controlling the ball 40 of a valve 41 normally closed under the action of a spring 42. The movable cores 43, 44 respectively controlled by the second and third electro-magnet coils 32, 35, are coupled to each other at their adjacent ends so as to act in opposite directions, said coupled ends being pivotally connected as indicated to 45, at one end of a swing arm 46, pivoted at its mid-point 47 on the rod 48 of the sliding member 49 of a three-way distributor 50 without backlash. Rod 48 is slidably mounted in a guide 51. Pivoted as at 52 to the other end of the swing arm 46 is one end of a rod 53, the other end of which is pivoted at 54, to one end of a swing arm 55. Pivotally connected as at 56 at the mid-point of arm 55, is the free end of rod 15. The other end of arm 55 is pivoted at 57 on a rod 58 slidably mounted in a guide 59'. The rod 58 extends into a differential distributor 59, associated with the three-way distributor 50. The rod 58 carries two active sliding portions 60, 61 which define three chambers 62, 63, 64 in the distributor 59. Chamber 62 is continuously fed with low-pressure fluid from a low-pressure pump 65 through ducts 66, 67 and 68 and communicates continuously with the inlet 69 of the distributor 50 through a duct 70, the duct 66 having a one-way check valve 66a therein. The chamber 63 is connected to a tank 71 through a duct 72. Chamber 64 continuously communicates with a chamber 73 in the distributor 50 through a duct 74.

The distributor 50 has its movable member 75 balanced when pressure is admitted through the duct 70. The chamber 73 of the distributor 50 which communicating with the chamber 64 of differential distributor 59 through the duct 74, can be put into communication selectively, either with the duct 70 when the movable members 49 and 75 are moved towards the right, or with the tank 71 through an axial passage 78, radial holes 79, the outlet 76 of the distributor 50 and the ducts 77 and 72 when the movable member 49 is moved towards the left.

These motions of the movable members 49 and 75 are controlled by the rod 48.

The valve-member 60 of the differential distributor 59 closes in its neutral position a duct 80 communicating with a port 81 leading into the cylindrical space 82 of a jack 83, the annular space 84 of which is continuously fed at its inlet 85 with low-pressure fluid from the pump 65 through ducts 66 and 67. A high-pressure pump 86 communicates through ducts 87, 88 with the inlet of the valve 41, the outlet of which communicates through a duct 89 with the duct 68 which continuously feeds, as stated above, the chamber 62 of the differential distributor 59.

Each pump 65, 86 is completed by an accumulator 95, 90 respectively which, by virtue of its very nature, enables the rate of flow of the pumps to be reduced, and constitutes an emergency safety power reserve.

The piston 91 of the jack 83 has its rod 92 articulated at 93 on a swing arm 94 keyed on the shaft 2 of the flap 1.

The operation of this device is as follows:

When the normal attitude of the craft on which the device is mounted becomes disturbed, the pendulum 3 is shifted by a given angle under the action of forces which are exerted on it, due to its very nature.

The stabilizing action is responsive to the angular displacements of the pendulum 3 only when the same are effected at a speed exceeding a predetermined value.

This is due to the presence of the opening 8 in the bellows 7 which is deformed without imparting any displacement to the rod 9 when said angular displacement of the pendulum 3 is slower than said predetermined speed, so that the air has time enough to escape through said opening. On the other hand, the second pendulum 18 ensures the controlling action of the system when displaced through a given angle, independently of the pendulum 3, regardless of the speed at which the angular shift takes place.

In other words, when the unbalance exceeds a given value, the system is always responsive while, below the said value, it is responsive only if the speed of the angular displacement is higher than a predetermined value.

The two above-described mercury switches are closed successively under the action of the forces which are exerted on the mercury, due to its weight, if the pendulum 18 swings to either side of its resting position, shown in Figure 1, by a sufficient angle. The mercury switch 21 is the first to be closed and completes the operating circuit of either coil 32 or coil 35, according to whether the pendulum 18 swings anticlockwise or clockwise (either due to its own weight, or through the linkage 6—7—9—12—16, under the action of the pendulum 3). When the coil 32 is energized, the core 43 is attracted towards the right so that, if the pivot 52 remain stationary, the sliding members 49 and 75 of the distributor 3 are displaced towards the right through the linkage 46—48.

Under these conditions, low-pressure fluid is fed into the cylindrical chamber 64 of the distributor 59 as follows: pump 65—ducts 66, 67, 68—chamber 62—duct 70—inlet 69—chamber 73—duct 74—chamber 64. The sliding member of the distributor 59 is thus differentially subjected to low pressure, so that the said sliding member is displaced towards the left (assuming that the articulation 57 yields). The active portion 60 of the said sliding member then opens the duct 80, so that the fluid previously contained in the cylindrical space 82 of the jack 83 can be evacuated as follows: port 81—duct 80—chamber 63—duct 72—tank 71. Since the annular space 84 of the jack 83 is continuously fed with low pressure from the pump 65 through the ducts 66—67 and port 85, the piston 91 of the said jack is displaced towards the left so that the flap 1 is angularly shifted anticlockwise through the linkage 92—94. The relative arrangement of the flap 1 and the pendulum system 3—18 is such that the stabilizing action of the flap 1 has for its effect to bring the pendulums 18 and 3 back into the neutral position shown in Figure 1.

Now, if the pendulum 18 swings in the opposite direction, the coil 35 is energized and the sliding member 49 of the distributor 50 is displaced towards the left under the action of the core 44 through the linkage 46—48 (assuming, as previously, that the articulation 52 remains stationary). The fluid contained in the chamber 64 of the distributor 59 can then escape as follows: duct 74—chamber 73—passages 78, 79—outlet 76—ducts 77, 72—tank 71. The slidable member of the distributor 59 is then subjected to low pressure only on the annular area of the active portion 60, so that the said sliding member is displaced towards the right (assuming, as previously, that the articulation 57 yields).

The cylindrical space 82 of the jack 83 is then fed with low-pressure fluid, as follows: pump 65—ducts 66, 67, 68—chamber 62—duct 80—port 81. Since the area of piston 91 exposed to the pressure on the fluid in chamber 82 is greater than the area of the piston exposed to the pressure on the fluid in chamber 84 by reason of the rod 92 in said chamber 84, a differential pressure is provided so that piston 91 is displaced towards the right. Thus, the flap 1 is rotated clockwise through the linkage 92—94 now exerting its stabilizing action in a direction opposite to the previous one and tending to bring back the pendulums 18 and 3 once more into their neutral position.

Now, if the angular shift of the pendulum 18 in either direction exceeds a given angle, the mercury switch 20 is closed, as well as the mercury switch 21 and the coil 27 is energized, together with one of the coils 32, 35. The valve 41 is thus opened, its ball 40 being unseated by the rod 39 actuated from the core 36 through the swing arm 37.

High-pressure fluid is then fed into the chamber 62 of the distributor 59 as follows: pump 86—ducts 87, 88—valve 41 (then open)—ducts 89 and 68.

Now, as previously, according to whether the shift of the pendulum 18 has taken place in one direction or in the other, the chamber 64 of the distributor 59 either is fed with high-pressure fluid through the duct 70, the port 69, the chamber 73, the duct 74, or put into communication with the tank 71 through the duct 74, the chamber 73, the passages 78 and 79, the outlet 76 and the ducts 77, 72.

In the first case, the sliding member of the distributor 59 is shifted towards the left under the differential action of the high-pressure fluid and in the other case, it is shifted towards the right under the action of the high-pressure fluid on the sole annular area of the active portion 60.

In the first case, the space 82 of the jack 83 is exhausted as previously, so that the piston 91 is displaced towards the left under the action of high pressure in the space 84 which also communicates with the valve 41 through the ducts 67, 68 and 89. In the second case, the piston 91 is displaced towards the right under the differential action of the high-pressure fluid brought into the space 82 of the jack 83 from the chamber 62 of the distributor 59 through the duct 80.

The device described above, is thus responsive to four variables, viz.: the amplitude of the angular shift of both pendulums with respect to their support, which is introduced by the mercury switches and/or said pendulums; the speed of said angular shift and resetting to normal position, which is introduced by the bellows 7 and its opening 8; the acceleration of said shifting and resetting which is introduced by the variation of the opening of the three-way distributor without backlash 50; and the gradient of acceleration which is introduced by the differential distributor 59.

In the embodiment shown in Fig. 2, the pendulum 3 has been replaced by a gyro 103, the inclination of which is transmitted by an arm 104 to the rod 6 and hence, through the bellows 7, to the rod 9.

In this embodiment, the opening 8 of the bellows 7 is associated with a pipe 105 leading to a reservoir of liquid 106 which permanently maintains in the bellows 7 liquid under slight pressure, so that the opening 8 is capable of exerting a dash-pot effect to correct, as previously, the action of the control system on the rod 9. Thus, under a given amplitude of the angular shift of the pendulum 18, the rod 9 is only actuated if the oscillations of the gyro 103 take place at a speed higher than a predetermined value.

In the alternative embodiment shown in Fig. 3, the differential distributor 59 comprises two additional chambers 98 and 99, formed by additional active portions 100 and 101 respectively, of the sliding member 58. In the neutral position shown in Fig. 3, the chamber 98 communicates with the tank through a duct 102 in parallel with the duct 72 leading to said tank from the chamber 63. The chamber 99 permanently communicates with the low pressure-high pressure feeding ducts 68/89 through a duct 97.

In this embodiment, the two ducts 80 and 96, which are closed, in the neutral position of the sliding member 58, by the active portions 101 and 60 respectively, interconnect the distributor 59 with the two opposed compartments 82, 84 respectively, of the jack 83.

This arrangement has an advantage over that of Fig. 1: the piston 91 of the jack 83 is acted upon in either direction by the whole low or high pressure instead of being actuated differentially. This improves the efficiency of the stabilizing device, all other things being equal.

In the embodiment of Fig. 4, the stabilizing follow-up system according to the invention, is completed by a device including two Pitot-like tubes 107, 108 obliquely extending, e.g., in front of the craft, it being obvious that the same device could be provided at the rear end of the craft; said tubes respectively communicate with two compartments 109, 110 separated by a flexible diaphragm 111 carrying a mirror 112 which reflects the light rays emitted by an electric lamp 113 towards two photo-electric cells 114, 115, preferably of the kind utilizing the properties of germanium or selenium. The relative arrangement of the lamp 113, the mirror 112 and the cells 114, 115 is such that in the mean position of the diaphragm 111 corresponding to equal pressures ahead of the Pitot-like tubes 107, 108, the light beam falls between the cells 114, 115 without impinging thereon, as shown at 116. Now, if for example, the pressure ahead of the Pitot-like tube 108 becomes higher than that ahead of the Pitot-like tube 107, the diaphragm 111 is deformed towards the left (in the drawing), so that the mirror 112 is tilted clockwise, which results in rising the reflected rays which now impinge upon the cell 114, as shown at 117. Similarly, if the pressure detected by the Pitot-like tube 107 becomes higher than the pressure detected by the Pitot-like tube 108, the mirror 112 is tilted anticlockwise and the light beam is brought at 118 to impinge upon the cell 115.

Two individual sources of electric current, 119 and 120 separately feed two relays 121, 122, under the control of the cells 114, 115 respectively. The relays 121, 122 control in turn energizing circuits for two solenoids 123, 124 respectively. These solenoids are provided with a common moving core 125, pivoted through a pin 126 and an eyelet 127 on the swing arm 46 (see Fig. 1).

With this arrangement, it is clear that any important difference of pressure ahead of the craft will correct, in a given direction, the action of the swing arm 46 of the pendulum system or gyro, or the like, which action is exerted, as previously described, by the solenoids 32 and 35.

It will be noted that the correction of the action of the solenoids 32, 35 by the solenoids 123, 124 may be additive or subtractive, by a simple inversion of the relative position of the said solenoids 123, 124.

In a general manner, while in the above description is disclosed what is deemed to be practical and efficient embodiments of the invention, it should be well understood that it is not wished to be limited thereto, as there might be changes made in the arrangement, disposition and form of the parts without departing from the principle of the present invention.

In particular, the two sources of pressure fluid have been called hereabove the high-pressure and the low-pressure sources. It will be understood that both said sources could be of the same order of power within the scope of the invention. In this case, one of the sources would constitute a reserve of power to be used in case of failure of the other one.

Furthermore, the switching-on of the second source may determine automatic switching-off of the first one within the scope of the invention.

Finally it is obvious for those skilled in the art, that instead of using two sources at different pressures, it may be preferred in certain cases, using two sources having different rates of discharge either at the same or at different pressures.

What is claimed is:

1. A hydraulic follow-up system for stabilizing a craft around a given horizontal axis comprising, in combination, a controlling member having a neutral position corresponding to the angular position in which said craft is to be stabilized and automatically movable on either side of said neutral position in response to destabilization of said craft on either side of said angular position, a control surface movable on either side of a neutral position to reset said craft into said angular position, a pendulum hanging from a pivot oriented along said axis, connecting means between said controlling member and said pendulum, to determine the angular shift of the latter in response to automatic motion of the former, means incorporated in said connecting means to vary the amplitude of said pendulum angular shift correction as a function of the speed of said controlling member automatic motion, a first source of pressure fluid, a second source of pressure fluid, pressure-fluid motor means operatively connected with said control surface and valve means responsive to the angular position of said pendulum to selectively feed said motor means with fluid from said first source, as said pendulum angular shift reaches a first predetermined value, and with fluid from said second source, as said pendulum angular shift reaches a second predetermined value, higher than the first one.

2. A hydraulic follow-up system according to claim 1, wherein said second source is capable of supplying fluid under a higher pressure than said first source.

3. A hydraulic follow-up system for stabilizing a craft around a given horizontal axis comprising, in combination, a controlling member having a neutral position corresponding to the angular position in which said craft is to be stabilized and automatically movable on either side of said neutral position in response to destabilization of said craft on either side of said angular position, a control surface movable on either side of a neutral position to reset said craft into said angular position, a pendulum hanging from a pivot oriented along said axis, connecting means between said controlling member and said pendulum to determine the angular shift of the latter in response to automatic motion of the former, means incorporated in said connecting means to vary the amplitude of said pendulum angular shift correction as a function of the speed of said controlling member automatic motion, a first source of pressure fluid, a second source of pressure fluid, pressure-fluid motor means operatively connected with said control surface, a first and a second contact means adapted to be selectively closed for two predetermined angular positions of said pendulum respectively, a first electro-magnetic system, means to energize said first electro-magnetic system under the control of said first contact means, a second electro-magnetic system, means to energize said second electro-magnetic system under the control of said second contact means, and valve means selectively responsible to the energizing of said first and second electro-magnetic systems to feed said pressure fluid motor means with fluid from said first and second sources respectively.

4. A hydraulic follow-up system according to claim 3 wherein said contact means are constituted by two mercury switches carried by said pendulum and wherein said electro-magnetic systems include a plurality of solenoids provided with energizing circuits passing through the contacts of said mercury switches.

5. A hydraulic follow-up system according to claim 1, wherein said pressure fluid motor means are constituted by a hydraulic jack and wherein said valve means include a three-way distributor, a switching valve to selectively feed said three-way distributor with fluid from said first and second sources of pressure fluid for two predetermined angular positions of said pendulum, and a differential distributor to feed said jack with said pressure fluid under the control of said three-way distributor, said connecting means being operatively connected to the movable members of said distributors, to control the operation of said distributor as a function of the acceleration and gradient of acceleration of the automatic motion of said controlling member.

6. A hydraulic follow-up system according to claim 5, wherein said hydraulic jack is a differential jack having its annular chamber permanently fed with fluid from said first source and wherein said differential distributor is provided with an annular chamber permanently fed with fluid from said first source and with a cylindrical chamber, selectively put into communication with said source, or with a tank, under the control of said three-way distributor, fluid-conducting means being furthermore provided to substitute fluid from said second source for that of said first one, as said switching valve is correspondingly actuated.

7. A hydraulic follow-up system according to claim 5, wherein said hydraulic jack is a double-acting jack, and wherein said differential distributor comprises an annular chamber permanently communicating with said first source of pressure fluid, a cylindrical chamber adapted to be put into communication with said source, or with a tank, under the control of said three-way distributor, a working chamber permanently communicating with said first source, and a movable member adapted to selectively put said working chamber into communication with either compartment of said double-acting jack, according to whether said differential distributor cylindrical chamber is fed with fluid from said first source, or connected to said tank, fluid-conducting means being furthermore provided to substitute fluid from said second source to that of said first one, as said switching valve is correspondingly actuated.

8. A stabilizing hydraulic follow-up system according to claim 1, wherein said controlling member is constituted by a second pendulum and wherein said amplitude varying means are constituted by a bellows having a hole to permit deformation while limiting the speed of said deformation.

9. A stabilizing hydraulic follow-up system according to claim 1, in which said controlling member is constituted by a gyro and in which said amplitude varying means are constituted by a bellows, a tank containing a liquid, and means to permanently communicate the inside of said bellows with said liquid to permit the deformation of said bellows while limiting the speed of said deformation.

10. A stabilizing hydraulic follow-up system according to claim 1, in which such craft has a closed chamber, a pliable diaphragm is positioned in said chamber to divide the latter into two compartments, two Pitot-like tubes, extending obliquely and outwardly of such craft, each of said Pitot-like tubes being in communication respectively with one of said compartments, and means responsive to displacements to said diaphragm and operatively connected with said valve means.

11. A stabilizing hydraulic follow-up system according to claim 10, wherein said means include a source of light, two photo-electric cells, a mirror carried on said diaphragm to reflect light rays from said source on one of said cells whenever said diaphragm is shifted on either side of a neutral position, two electro-magnetic relays, each fed with the output of one of said cells, two solenoids, each energized under the control of one of said relays, and means further to control the action of said pendulum on said valve means in either direction whenever one of said relays is energized.

12. A hydraulic control system according to claim 2, wherein said first source includes a check valve device whereby the switching-on of said second source determines switching-off of said first source.

13. A stabilizing hydraulic follow-up system according to claim 1, in which said controlling member is constituted by a gyro and in which said amplitude varying means are constituted by a bellows having a hole to permit its deformation while limiting the speed of the said deformation.

14. A follow-up system for stabilizing a craft comprising, in combination, a control surface movable on either side of a neutral position to set said craft into a desired stabilized position, at least one pair of Pitot-like tubes extending obliquely and outwardly to said craft, a closed chamber in said craft, a pliable diaphragm to divide said chamber into two compartments, each communicating with one of said tubes and means operatively connected with said control surface and responsive to displacements of said diaphragm in response to differences of pressure arising in the vicinity of said craft due to extraneous perturbances.

15. A follow-up system according to claim 14, wherein said means include a source of light, two photo-cells, a mirror carried on said diaphragm to reflect light rays from said source on one of said cells whenever said diaphragm is shifted on either side of a neutral position, two electro-magnetic relays each fed with the output of one of said cells, two solenoids each energized under the control of one of said relays and means to operate said control surface in either direction whenever one of said relays is energized.

References Cited in the file of this patent

UNITED STATES PATENTS 2,791,092    Mercier _____ May 7, 1957